United States Patent [19]
Kamio et al.

[11] Patent Number: 5,717,475
[45] Date of Patent: Feb. 10, 1998

[54] ELECTRODE SUBSTRATE, PROCESS FOR PRODUCING THE SUBSTRATE, LIQUID CRYSTAL DEVICE AND PROCESS FOR PRODUCING THE DEVICE

[75] Inventors: Masaru Kamio, Sagamihara; Hiroyuki Tokunaga, Fujisawa; Haruo Tomono; Yuji Matsuo, both of Machida, all of Japan

[73] Assignee: Canon Kabushiki Kaisha, Tokyo, Japan

[21] Appl. No.: 789,867

[22] Filed: Jan. 28, 1997

[30] Foreign Application Priority Data

Jan. 30, 1996 [JP] Japan ............................. 8-041613

[51] Int. Cl.$^6$ .................... G02F 1/1343; G02F 1/1222
[52] U.S. Cl. .................... 349/147; 349/148; 349/122
[58] Field of Search .................... 349/147, 148, 349/122, 138

[56] References Cited

U.S. PATENT DOCUMENTS

| | | | |
|---|---|---|---|
| 4,684,218 | 8/1987 | Aizawa et al. | 349/147 |
| 4,712,874 | 12/1987 | Sekimura et al. | 349/147 |
| 4,728,176 | 3/1988 | Tsuboyama et al. | 349/148 |
| 4,744,637 | 5/1988 | Sekimura et al. | 350/339 R |
| 4,786,148 | 11/1988 | Sekimura et al. | 350/339 F |
| 4,818,075 | 4/1989 | Takao et al. | 350/339 F |
| 4,917,471 | 4/1990 | Takao et al. | 350/339 F |
| 5,101,289 | 3/1992 | Takao et al. | 359/68 |
| 5,270,846 | 12/1993 | Watanabe et al. | 349/148 |
| 5,282,070 | 1/1994 | Nishida et al. | 349/148 |
| 5,388,328 | 2/1995 | Yokono et al. | 29/852 |
| 5,398,126 | 3/1995 | Takao et al. | 359/68 |
| 5,501,755 | 3/1996 | Dahlquist | 156/153 |

FOREIGN PATENT DOCUMENTS 2-063019 3/1990 Japan.
6-347810 12/1994 Japan.

OTHER PUBLICATIONS

N.A. Clark et al., "Ferroelectric Liquid Crystal Electro-Optics Using the Surface Stabilized Structure," Molecular Crystals and Liquid Crystals, v. 94 Nos. 1 & 2 (1983), pp. 213-233.

*Primary Examiner*—William L. Sikes
*Assistant Examiner*—Tiep H. Nguyen
*Attorney, Agent, or Firm*—Fitzpatrick, Cella, Harper & Scinto

[57] ABSTRACT

An electrode substrate is produced through at least the following steps of: forming a plurality of first electrodes on a light-transmissive substrate while leaving a spacing between the first electrodes, filling a resin in the spacing, curing the filled resin, and forming a plurality of second electrodes on the first electrodes and the resin so as to be in contact with the associated first electrodes, respectively. In the electrode substrate, the first electrodes have a thickness h (nm) and an average surface roughness d (nm) and the resin has a curing shrinkage ratio $\alpha$ (%). The thickness h, the average surface roughness d and the curing shrinkage ratio a satisfies the following relationship: $d \geq \alpha \cdot h/1000$. A liquid crystal device is produced by using the electrode substrate satisfying the above relationship, whereby a ripple-shaped shrinkage due to a shrinkage of the resin can be prevented in an effective optical modulation region to minimize a cell gap unevenness and provide a uniform alignment state to liquid crystal molecules, thus suppressing occurrences of an ununiform optical state, crosstalk and an irregularity in drive characteristics to improve display qualities.

22 Claims, 6 Drawing Sheets

ELECTRODE SUBSTRATE, PROCESS FOR PRODUCING THE SUBSTRATE, LIQUID CRYSTAL DEVICE AND PROCESS FOR PRODUCING THE DEVICE

FIELD OF THE INVENTION AND RELATED ART

The present invention relates to an electrode substrate including at least two types of electrodes and a process for producing the electrode substrate. The present invention also relates to a liquid crystal device using the electrode substrates and a process for producing the liquid crystal device.

Heretofore, a liquid crystal device (or a liquid crystal panel) wherein a liquid crystal material is utilized for displaying information has been used in various fields in the art.

Figure 1A:
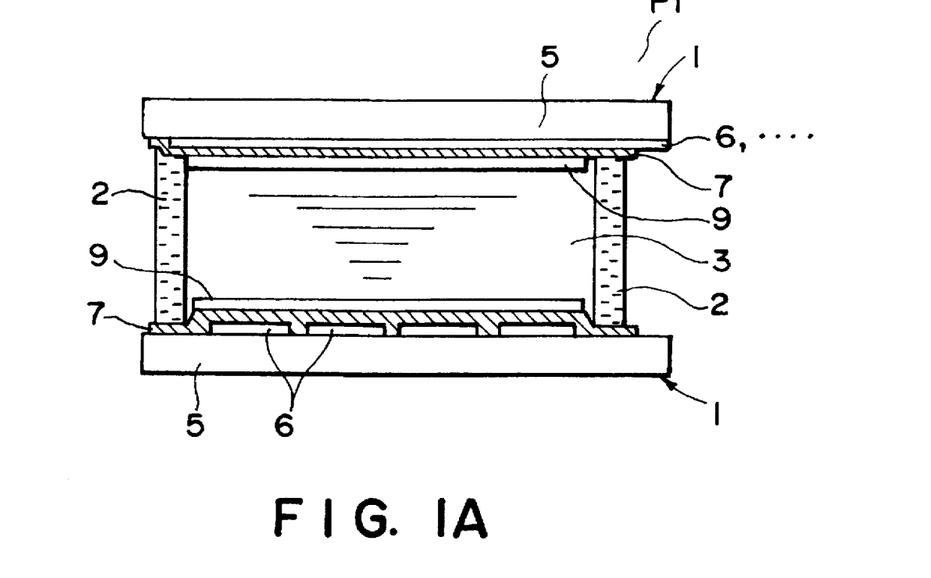
FIG. 1A is a schematic sectional view of an embodiment of a structure of a conventional liquid crystal panel and FIG. 1B is a plan view for illustrating a shape of transparent electrodes used in the liquid crystal panel shown in FIG. 1A.

FIG. 1A shows an embodiment of a structure of such a liquid crystal panel.

Referring to FIG. 1A, a liquid crystal panel P1 includes a pair of electrode substrates 1 applied to each other with a sealing agent 2 so as to leave a spacing therebetween, and a liquid crystal 3 filling the spacing. In this embodiment, the liquid crystal 3 comprises a ferroelectric liquid crystal, thus constituting a ferroelectric liquid crystal panel.

Figure 1B:
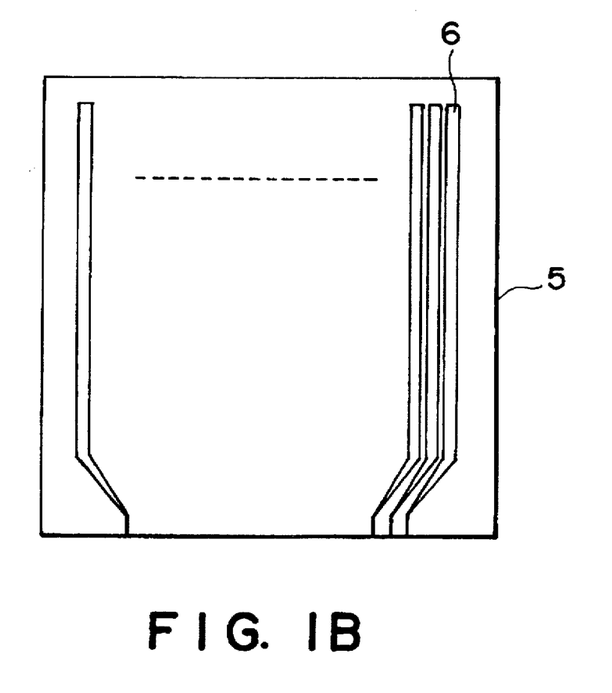

Each of the electrode plates 1 is provided with a glass substrate 5 the surface of which is provided with a plurality of transparent electrodes 6 of indium-tin oxide (ITO). The transparent electrodes 6 generally have a thickness of 50–150 nm and are formed into a stripe pattern by patterning treatment as shown in FIG. 1B. On the surface of these transparent electrodes 6, a ca. 500–3000 Å-thick insulating film 7 comprising, e.g., silicon oxide or titanium oxide for preventing an occurrence of short-circuit is formed, and further thereon, an alignment control film 9 comprising, e.g., polyimide is formed.

The ferroelectric liquid crystal 3 generally comprises a chiral smectic liquid crystal assuming, e.g., chiral smectic C (SmC*) phase or chiral smectic H (SmH*) phase. Accordingly, the ferroelectric liquid crystal 3 shows a helical alignment (orientation) wherein liquid crystal molecules are twisted in their (average) long axis direction in case where the influence of the pair of electrode substrates 1 thereon is small (e.g., the case of too distant electrode plates 1 with a spacing therebetween of above 100 μm) but the helical alignment of the ferroelectric liquid crystal 3 in the long axis direction is suppressed (or unwounded) by providing the liquid crystal panel P1 with a small cell thickness of, e.g., 1–3 μm, as described by N.A. Clark et al. "MCLC", vol. 94, pp. 213–234 (1983).

The liquid crystal panel P1 is driven by applying a voltage to oppositely disposed transparent electrodes 6 and accordingly the liquid crystal 3 disposed between the oppositely disposed transparent electrodes 6 constitutes a capacitive load in an electric circuit. However, the transparent electrodes 6 has a sheet resistance of 20–400 ohm and a volume resistivity of $200\times10^{-8}$–$4000\times10^{-8}$ ohm.m, thus being liable to cause propagation delay of a voltage waveform therein. As a result, it has been difficult to provide a resultant liquid crystal panel with a high resolution and a large picture area. This problem has been more noticeable in the case of the ferroelectric liquid crystal panel having a small liquid crystal layer thickness of 1–2 μm when compared with a twisted nematic (TN)-type liquid crystal device.

In order to remedy such a problem of the propagation delay of a voltage waveform, a method providing a larger thickness to the transparent electrode 6 may be adopted but is accompanied with a longer film formation time and a lowering in adhesiveness to the glass substrate 1. In addition, a resultant liquid crystal panel shows a lower transmittance and therefore the transparent electrodes 6 per se are visually recognized, thus deteriorating display qualities of the liquid crystal panel.

As another method for solving the problem of the voltage waveform propagation delay, a method wherein low-resistive metal electrodes of Cr ($15\times10^{-8}$ ohm.m) or Mo ($6\times10^{-8}$ ohm.m) are formed on the surface of the transparent electrodes 6 (facing to the liquid crystal 3) may be used.

However, in this method, the metal electrodes cannot be made thick due to the following factors (i) and (ii), thus resulting in a limit to improvement in propagation delay of a voltage waveform.

(i) Metal electrodes are oppositely disposed so as to sandwich therebetween a liquid crystal but the thickness of the metal electrodes is restricted depending on a spacing between a pair of electrode substrates. Specifically, if the spacing between the electrode substrates is 1.1 μm, the metal electrodes cannot have a thickness of above 550 nm and, in an actual liquid crystal panel, have a considerably small thickness because it is necessary to form, e.g., an insulating layer on the metal electrodes.

(ii) Even in case where such metal electrodes are formed, similarly as in the liquid crystal panel shown in FIG. 1A, it is necessary to coat the metal electrodes and the transparent electrode with an alignment control film 9 and to align liquid crystal molecules at a certain order by the alignment control film 9 at the same time. However, in this case, the alignment control film 9 has an unevenness resulting from the metal electrodes and has a large unevenness when thick metal electrodes are used, thus resulting in an optical difference between recesses (pits) and projections to lower display qualities of the liquid crystal panel. Further, the liquid crystal panel is liable to cause a change in responsiveness of the liquid crystal to an applied electric field between at the recesses and projections, thus resulting in an occurrence of crosstalk. Moreover, due to the unevenness of the alignment control film 9 resulting from the metal electrodes, it becomes difficult to uniformly effect a rubbing treatment of the alignment control film 9, thus likewise resulting in the optical difference and the occurrence of crosstalk. These problems are more noticeable in a liquid crystal panel having a small pixel size for providing a high resolution. Accordingly, in order to remedy such problems, it is necessary to provide the metal electrodes with a thickness of at most a prescribed value (actually at most 250 nm).

In view of the above factors (i) and (ii), there has been proposed a method for obviating the voltage waveform propagation delay wherein metal electrodes consisting of a low-resistive metal, such as Cr or Mo are formed on a back surface of the transparent electrodes 6 (facing to the glass substrate 1), not on the (front) surface of the transparent electrodes 6 (facing to the liquid crystal 3), as described in Japanese Laid-Open Patent Application (JP-A) 2-63019 and 6-347810.

Figure 2A:
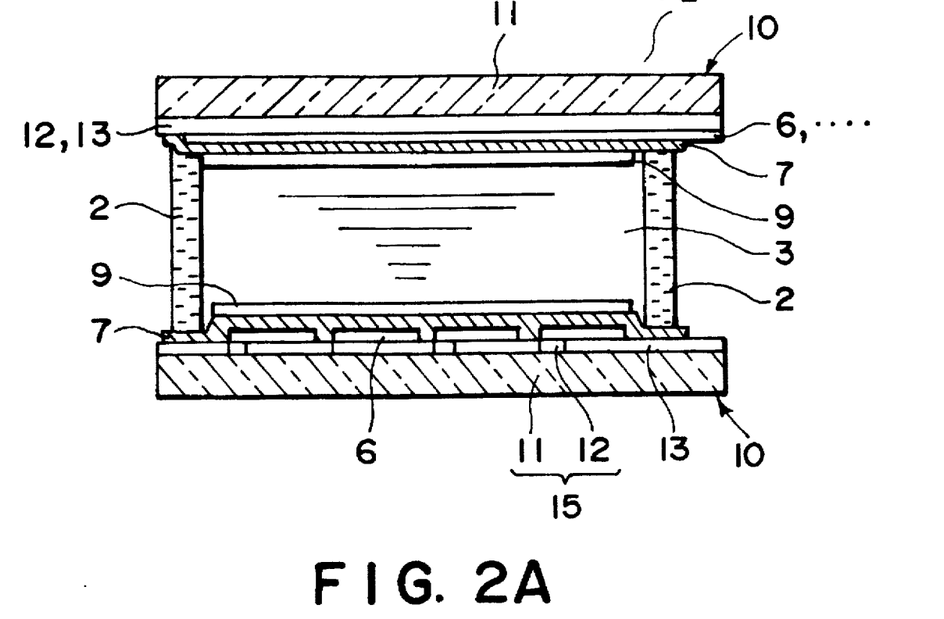
FIG. 2A is a schematic sectional view of another embodiment of a structure of a conventional liquid crystal panel and FIG. 2B is a partially enlarged sectional view of the liquid crystal panel of FIG. 2A.
Figure 2B:
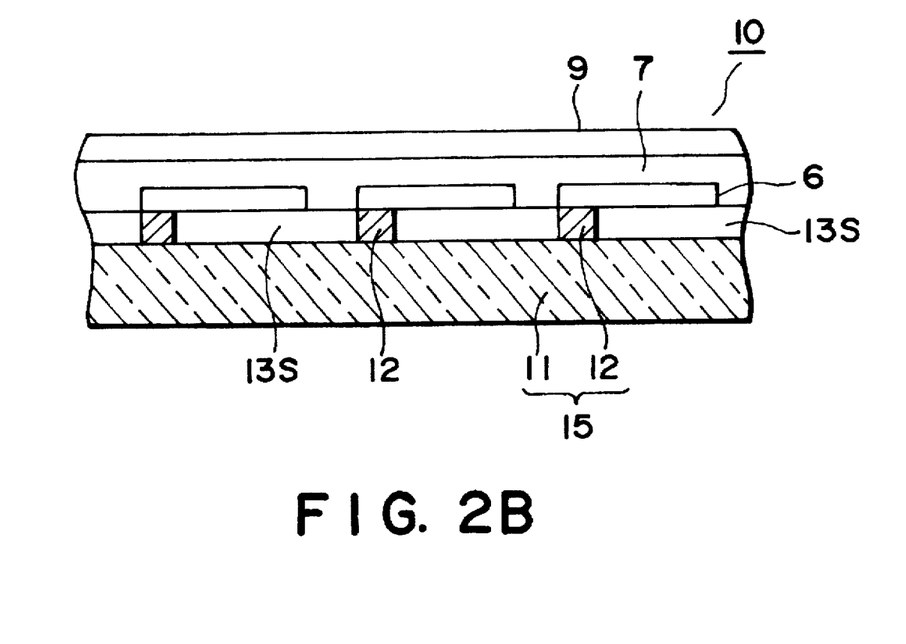

FIGS. 2A and 2B are schematic views of an embodiment of a structure of a liquid crystal panel employing such a method.

Referring to FIGS. 2A and 2B, a liquid crystal panel P2 includes a pair of substantially oppositely disposed electrode substrates 10 each provided with a transparent or transmissive substrate (glass substrate) 11 on which a plurality of ca. 1 μm-thick metal electrodes (first electrodes) 12 in a stripe shape are disposed with a certain spacing. As specifically shown in FIG. 2B, the spacing is filled with a ultraviolet light-curable resin (hereinafter referred to as "UV curing resin") 13S. Herein, with respect to the UV curing resin, the reference numeral 13S is used for describing a UV curing resin in a solid state after curing, a reference numeral 13L is used for describing it in a liquid state before curing, and a reference numeral 13 is used for describing the UV curing resin in case where a state thereof need not be particularly differentiated.

The UV curing resin 13S (13 in FIG. 2A) and the metal electrodes 12 together constitute one surface on which a plurality of transparent electrodes (second electrodes) 6 in a stripe shape are formed and further thereon, an insulating film 7 and an alignment control film 9 are successively formed to prepare an electrode substrate 10. The transparent electrodes 6 are disposed along the metal electrodes 12 so that they are in contact with associated metal electrodes, respectively.

A pair of the electrode substrates 10 are applied to each other with a sealing agent 2 so as to leave a gap filled with a liquid crystal 3 as described above to prepare a liquid crystal panel P2.

Hereinbelow, a process for producing the liquid crystal panel P2 will be specifically described with reference to FIGS. 3A-3F.

(First Electrode-forming Step)

Figure 3A:
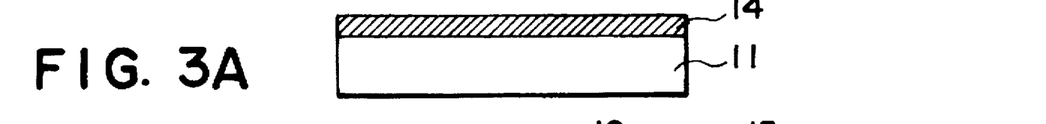
FIGS. 3A–3F are schematic sectional views for illustrating a conventional process for producing an electrode substrate.
Figure 3B:
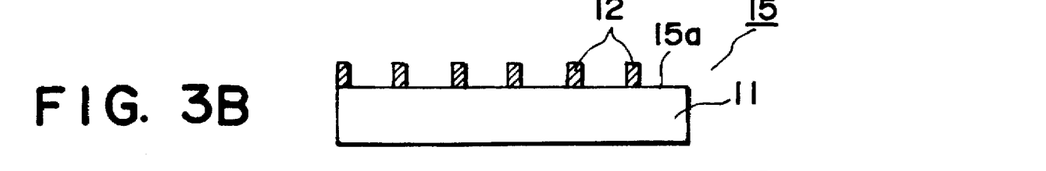

First of all, a thick metal layer 14 is formed on the surface of a glass substrate 11 by, e.g., a sputtering process (FIG. 3A). The metal layer 14 is subjected to patterning through a photolithographic process to form a multiplicity of stripe-shaped metal electrodes (first electrodes) 12 to constitute a wiring substrate 15 having a wiring face 15a where the metal electrodes 12 are disposed (FIG. 3B). The wiring face 15a of the wiring substrate 15 is subjected to a surface treatment with a silane coupling agent to ensure an adhesiveness between the glass substrate 11 and a UV curing resin 13 applied onto the glass substrate 11 in a subsequent step.

(Resin-supplying Step)

Figure 3C:
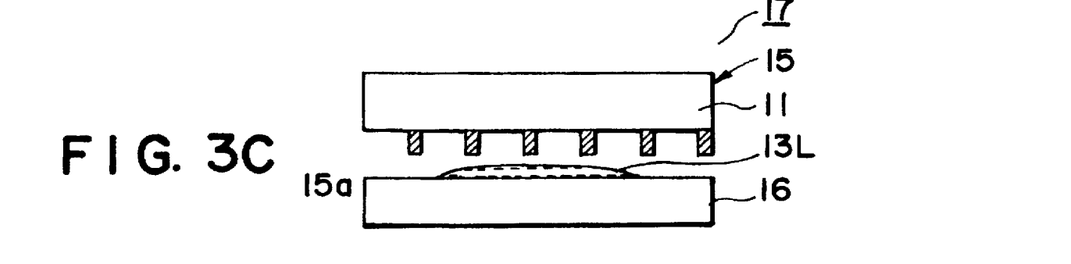

An appropriate amount of a UV curing resin 13L (before curing) is added dropwise to a smooth surface of a mold glass (smooth plate member) 16. The wiring face 15a of the wiring substrate 15 is superposed on the surface (supplied with the UV curable resin 13L) of the mold glass 16 so as to sandwich therebetween the UV curing resin 13L to provide a pressure-receiving member (a member subjected to pressure application) 17 (FIG. 3C). As a result, the UV curing resin 13L is filled in a spacing between the metal electrodes 12 at the wiring face 15a of the wiring substrate 15.

(Resin-curing Step)

Figure 3D:
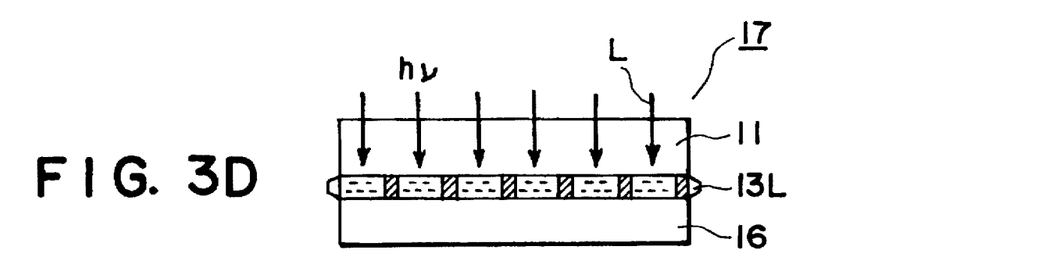

The pressure-receiving member 17 is pressed by a pressing machine (not shown). In such a state under pressure, the surface of the metal electrodes 12 and the UV curing resin 13L supplied to the spacing between the metal electrodes 12 are caused to come in contact with the smooth surface of the mold glass 16, so that the UV curing resin 13L (in a liquid state) and the metal electrodes having the spacing filled with the UV curing resin 13L together form a smooth surface. After the above pressure application (under 10 pressure application), the UV curing resin 13L is exposed to a ultraviolet (UV) light (or rays) L from the glass substrate 1 side by UV light irradiation providing a light energy hv, thus curing the UV curing resin 13L (FIG. 3D).

(Peeling Step)

Figure 3E:
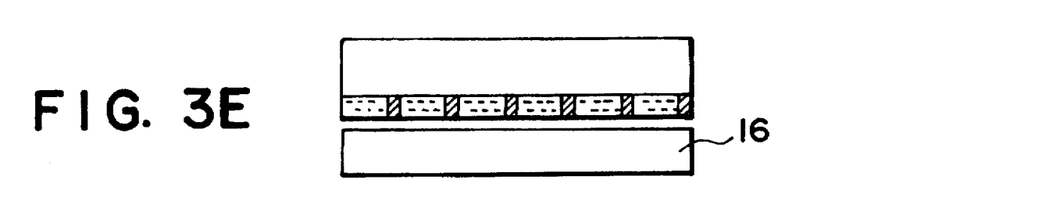

Then, the pressure-receiving member 17 is taken out from the pressing machine and the mold glass 16 is removed by peeling with a peeling device (not shown) (FIG. 3E).

(Second Electrode-forming Step)

Figure 3F:
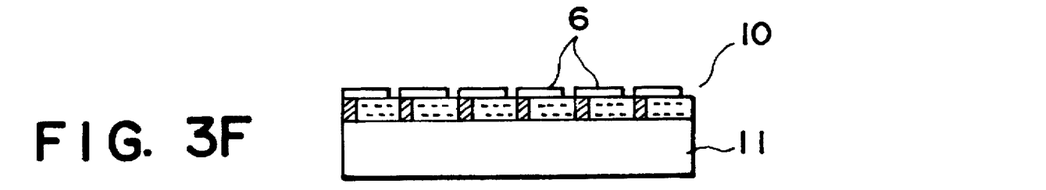

A multiplicity of transparent electrodes (second electrodes) 6 are formed on the surface of the metal electrodes 12 so that respective transparent electrodes 6 are caused to come in contact with associated metal electrodes 12,. respectively (FIG. 3F).

(Other Steps)

On the transparent electrodes 6, an insulating film 7 (not shown) and an alignment control film 9 (not shown) are successively formed to provide an electrode substrate 10.

A pair of such electrode substrates 10 are applied to each other with a sealing agent 2 to form a blank cell having a certain cell gap, which is then filled with a liquid crystal 3 to prepare a liquid crystal panel P2.

Incidentally, in the above process, the surface treatment with a silane coupling agent for enhancing an adhesiveness of the glass substrate 11 to the UV curable resin 13 is effected to the surface of the glass substrate 11 but is not effected to the surface of the mold glass 16 in view of peeling thereof, whereby an adhesiveness between the UV curing resin 13L and the mold glass 16 becomes smaller than an adhesiveness between the UV curing resin 13L and the glass substrate 11 but still leaves somewhat an adhesive power. On the other hand, the UV curing resin 13L generally has a shrink property at the time of curing by UV light irradiation. Accordingly, the UV curing resin 13 is partially peeled from the surface of the mold glass 16 due to the shrink property (i.e., a local adhesion of the UV curing resin 13 to the mold glass 16 is caused), so that the shrinkage of the UV curing resin 13 is partially promoted because there is no constraint thereon at the peeled portion, thus resulting in a sinkage 19 showing a remarkable unevenness in a ripple (wave) or wrinkle shape when viewed from the direction perpendicular to the metal electrode extension direction (hereinafter, referred to as "ripple-shaped sinkage") due to such a shrinkage.

Figure 4A:
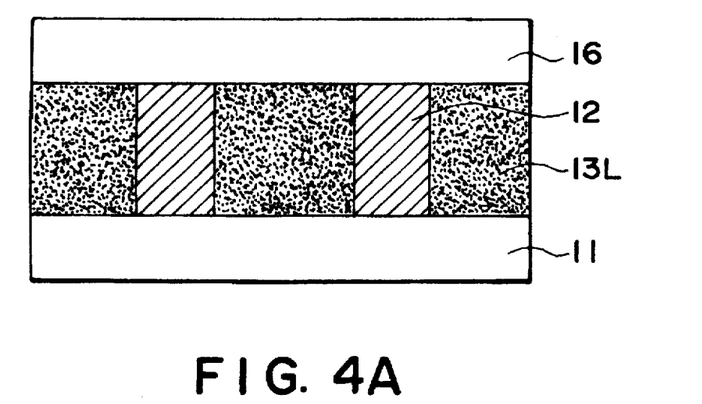
FIGS. 4A–4C are schematic sectional views for illustrating a ripple-shaped sinkage of a UV curable resin occurring in a conventional electrode substrate.
Figure 4B:
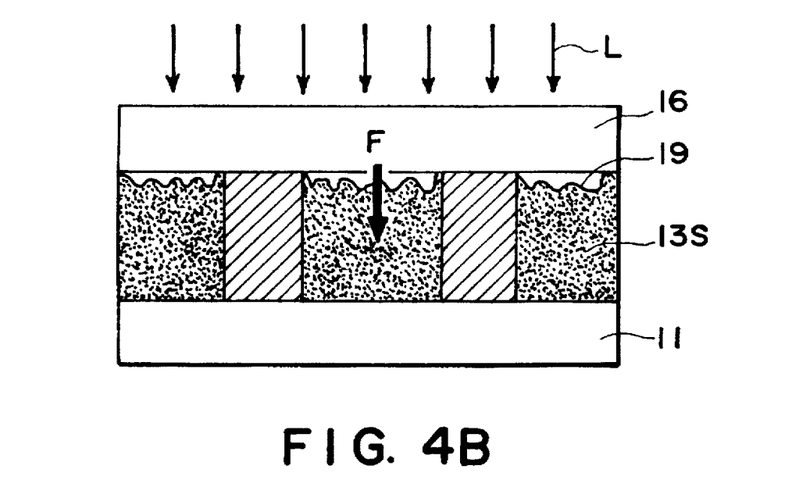
Figure 4C:
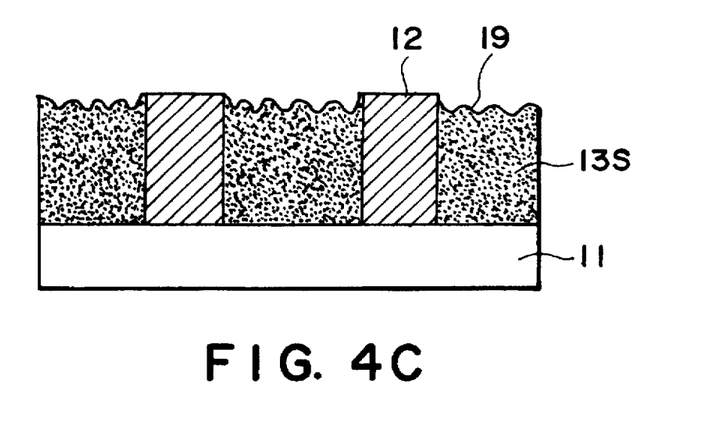

FIGS. 4A-4C are schematic views for illustrating a sinkage phenomenon (an occurrence of a ripple-shaped sinkage 19).

Referring to FIG. 4A, the metal electrodes 12 and the UV curing resin 13L filling the spacing between the metal electrodes 12 are sandwiched between the glass substrate 11 and the mold glass 16, followed by application of a pressure F (as shown in FIG. 4B) to show a state before curing the UV curing resin 13L. Then, the UV curing resin 13L is exposed to UV light L under no pressure application, thus changing in a shrinkage state 13S after curing of the UV curing resin 13L (FIG. 4B). The shrunken UV curing resin 13S consequently has a ripple-shaped sinkage after the mold glass is removed by peeling operation (FIG. 4C).

Accordingly, in case where a liquid crystal panel is produced by using such a pair of electrode substrates 10, not only the surface of the transparent electrode 6 but also the surface of the alignment control film 9 are toughened or become uneven at least in an effective optical modulation region (e.g., a display region of a display device), thus resulting in an ununiform alignment state of the liquid crystal 3 or causing a local cell gap decrease leading to an electric field concentration thereat. As a result, the liquid crystal panel is accompanied with problems of occurrences of an optical state, crosstalk and an irregularity in drive characteristics, thus resulting in a lowering in image qualities.

The metal electrodes 12 as described above per se have a permissible unevenness (with respect to adjacent resin portions) of about at most 250 nm. However, in an effective optical modulation region, even the liquid crystal panel having an unevenness of at most 250 nm is accompanied with the above-mentioned problems because the effective optical modulation region which is not light-interrupted is directly adversely affected by such an unevenness although the metal electrode portion is light-interrupted.

In the above-mentioned process described with reference to FIGS. 3A–3F, it is necessary to remove the UV curing resin 13L from the surface of the metal electrodes 12 in order to ensure an electroconductive property between the metal electrodes 12 and associated transparent electrodes 6. However, the removal of the UV curing resin 13L becomes insufficient in many cases by only pressing the surface of the metal electrode 12 against the mold glass 16 as described above. If the UV curing resin 13L remains at the metal electrode surface, a contact resistance between the metal electrodes 12 and the transparent electrodes 6 becomes large, thus causing the propagation delay of a voltage waveform and a display failure at a high resolution level.

SUMMARY OF THE INVENTION

An object of the present invention is to provide an electrode substrate free from a ripple-shaped sinkage of a UV curing resin and having a substantially smooth surface with respect to second electrodes in at least an effective optical modulation region and a process for producing the electrode substrate.

Another object of the present invention is to provide an electrode substrate capable of suppressing an irregularity in optical state and an occurrence of crosstalk when used in a liquid crystal device, and a process for producing the electrode substrate.

Another object of the present invention is to provide an electrode substrate capable of preventing a propagation delay of a voltage waveform by providing a good contact state between first electrodes and second electrodes when used in a liquid crystal device, and a process for producing the electrode substrate.

Another object of the present invention is to provide a liquid crystal device capable of being applicable to a device of a large picture area and a high resolution and a process for producing the liquid crystal device.

A further object of the present invention is to provide a liquid crystal device excellent in display qualities and a process for producing the liquid crystal device.

According to the present invention, there is provided an electrode substrate, comprising: a light-transmissive substrate, a plurality of first electrodes disposed with a spacing therebetween on the light-transmissive substrate, a resin filling the spacing, and a plurality of second electrodes disposed so as to be in contact with the associated first electrodes, respectively, wherein the first electrodes have a thickness h (nm) and an average surface roughness d (nm) and the resin has a curing shrinkage ratio $\alpha$ (%), said thickness h, average surface roughness d and curing shrinkage ratio $\alpha$ satisfying the following relationship:

$$d \geq \alpha \cdot h/1000.$$

In the electrode substrate according to the present invention, the first electrodes may preferably be metal electrodes and the second electrodes may preferably be transparent electrodes, particularly ITO (indium-tin oxide) electrodes. The first and second electrodes may preferably be supplied with an identical signal. Further, the spacing between the first electrodes may preferably be provided with a color filter layer in addition to the resin.

According to the present invention, there is also provided a process for producing an electrode substrate, at least comprising the steps of:

forming a plurality of first electrodes on a light-transmissive substrate while leaving a spacing between the first electrodes, filling a resin in the spacing, curing the filled resin, and forming a plurality of second electrodes on the first electrodes and the resin so as to be in contact with the associated first electrodes, respectively, wherein the first electrodes have a thickness h (nm) and an average surface roughness d (nm) and the resin has a curing shrinkage ratio $\alpha$ (%), said thickness h, average surface roughness d and curing shrinkage ratio $\alpha$ satisfying the following relationship:

$$d \geq \alpha \cdot h/1000.$$

In the above process according to the present invention, in the curing step of the resin, the resin may preferably be cured after the first electrodes and the resin is subjected to pressure application with a smooth plate member. The curing step of the resin may preferably be performed by irradiating a ultraviolet (UV) curable resin with ultraviolet light. The process may preferably further comprises a step of forming a color filter layer at the spacing between the step of forming the first electrodes and the step of filling the resin. The step of forming the first electrodes may preferably be performed through a sputtering process while controlling a temperature of the transmissive substrate so as to provide the first electrodes with an average surface roughness d satisfying the above relationship.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, preferred embodiments of the present invention will be specifically described with reference to FIGS. 5–7. In the following embodiments, structural members identical to those shown in FIG. 2 are indicated by the identical reference numerals, respectively and the above-described explanation therefor is omitted.

FIRST EMBODIMENT

A first embodiment of the present invention will be described with reference to FIGS. 5A and 5B and FIGS. 6A–6F.

Figure 5A:
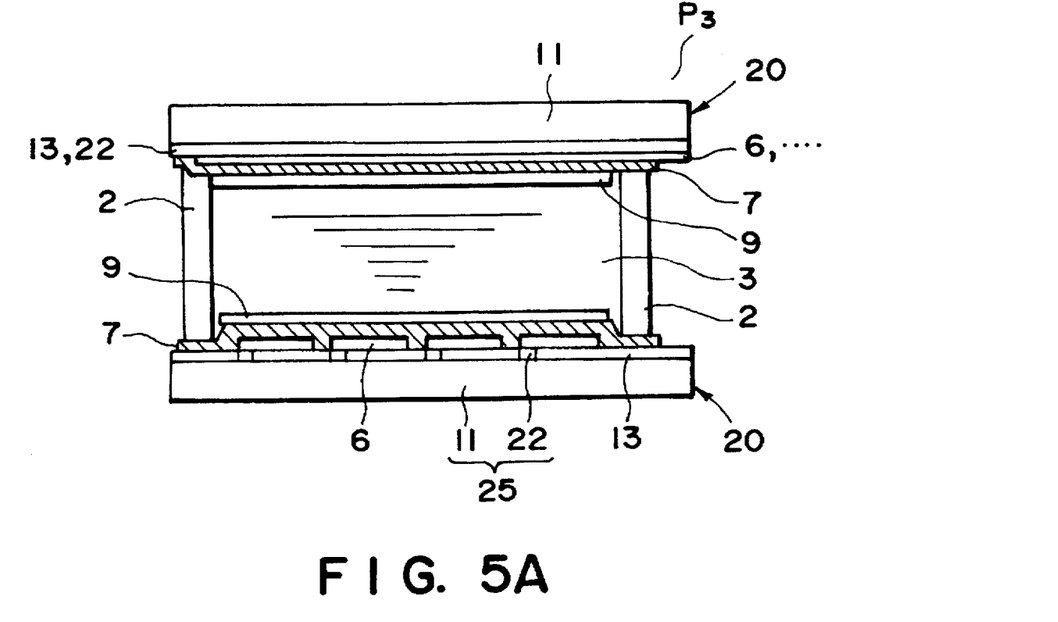
FIG. 5A is a schematic sectional view of an embodiment of a structure of a liquid crystal panel according to the present invention using an electrode substrate and FIG. 5B is a partially enlarged view of the electrode substrate shown in FIG. 5A.
Figure 5B:
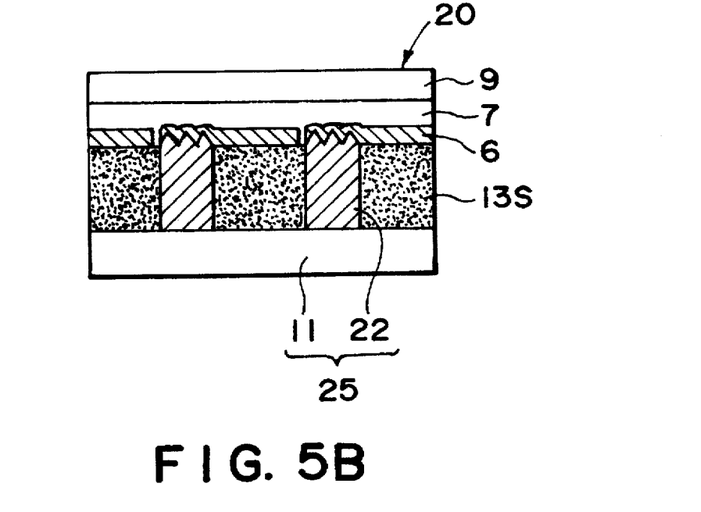

FIG. 5A is a schematic sectional view showing a cell structure of a liquid crystal panel P3 according to the present invention.

Referring to FIG. 5A (also FIG. 5B), the liquid crystal panel P3 includes a pair of substantially oppositely disposed electrode substrates 20 each provided with a transparent or transmissive substrate (glass substrate) 11 on which a plurality of metal electrodes (first electrodes) 22 in a stripe shape are disposed with a certain spacing. As specifically shown in FIG. 5B, the spacing is filled with a ultraviolet light-curable (curing) resin 13S.

The UV curing resin 13S (13 in FIG. 5A) and the metal electrodes 22 together constitute a substantially smooth one surface on which a plurality of transparent electrodes (second electrodes) 6 in a stripe shape are formed and further thereon, an insulating film 7 and an alignment control film 9 are successively formed to prepare an electrode substrate 20. The transparent electrodes 6 are disposed along the metal electrodes 22 so that they are in contact with associated metal electrodes, respectively.

A pair of the electrode substrates 20 are applied to each other with a sealing agent 2 so as to leave a gap to be filled with a liquid crystal 3 as described above to prepare a liquid crystal panel P3.

In this embodiments, the transparent electrodes comprised an ITO film and the glass substrate 11 had a size of 300×340 mm.

Further, as the UV curing resin 13, an acrylic monomer-based UV curable resin having a curing shrinkage ratio α of 10% (manufactured by Nippon Kayaku K.K.) was used. The known UV curing resins generally exhibit a curing shrinkage ratio α of 6–10% (for acrylic monomer-type) and of 2–5% (for epoxy resin-type).

The metal electrodes 22 was made of aluminum (Al) and had a thickness h of 2000 nm and an average surface roughness d of 20 nm. Accordingly, in this embodiment, α·h/1000=10×2000/1000=20=d, thus satisfying the above-described relationship: d≧α·h/1000.

In the present invention, the average surface roughness d may preferably be at most 200 nm in view of uniform cell gap.

Then, a more specific production process of the liquid crystal panel P3 will be described with reference to FIGS. 6A to 6F.

(First Electrode-forming Step)

Figure 6A:
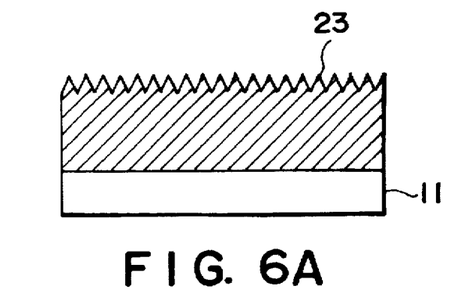
FIGS. 6A–6F are schematic sectional views for illustrating a process for producing an electrode plate according to the present invention.

An aluminum (Al) layer 23 (thickness h=2000 nm, average surface roughness d=20 nm) was formed on a glass substrate 11 through a sputtering process (FIG. 6A). The sputtering conditions were as follows.

Sputtering apparatus: RF (radio-frequency) sputtering apparatus ("705", manufactured by Nichiden Anelva K.K.)

Substrate temperature Ts: 140° C.,

Sputtering time t: 680 sec,

Ar flow: 200 sccm,

RF power density: 6 W/cm$^2$.

Herein, the average surface roughness d is determined based on values measured by using a surface roughness meter ("Alpha-Step 500", manufactured by TENCOR INSTRUMENTS Co.) in the following manner.

With respect to a region having a reference length for measurement of 500 μm, a sample metal layer (Al layer in this embodiment) is subjected to measurement of height (or depth) by using the above surface roughness meter to determine a difference in height between the highest portion and the lowest portion of the sample metal layer, thus obtaining a surface roughness. In a similar manner, the measurement is performed with respect to other 8 regions, thus obtaining 9 surface roughnesses in total. An average surface roughness is determined as an average value of the 9 surface roughnesses measured above.

Figure 6B:
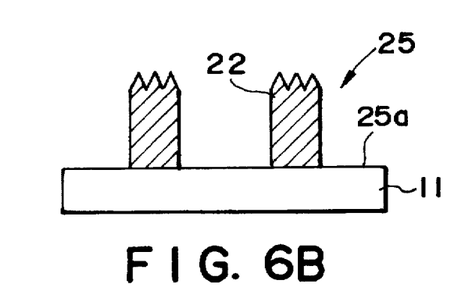

The Al layer 23 was then subjected to etching with an etchant comprising a mixed acid through a photolithographic process to form a plurality of metal electrodes (first electrode) 22 in a stripe shape (e.g., width=16 μm, pitch (spacing)=90 μm) on the glass substrate 11, thus providing a wiring substrate 25 having a wiring face 25a where the metal electrodes 22 are disposed (FIG. 6B).

A 50%-solution of an adhesiveness-reinforcing agent (silane coupling agent) ("A-174", mfd. by Nippon Unicar Company Ltd.) (not shown) in isopropyl alcohol was added dropwise onto the wiring face 25a by using a spin coating while rotating the wiring substrate 25 at 2000 rpm, followed by hot curing at 100° C.

(Resin-supplying Step)

Figure 6C:
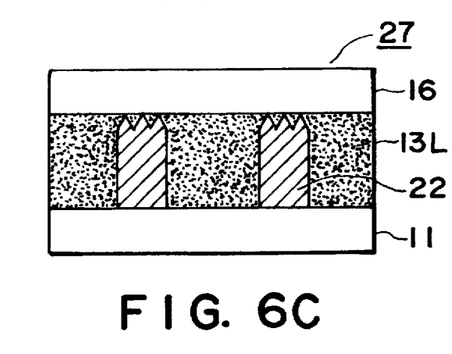

Onto the wiring force 25a of the wiring substrate 25, a liquid UV curing resin 13L was added dropwise while causing the wiring face 25a and a mold glass 16 having a smooth or flat surface to slowly come into contact with each other so as not to draw air (or cause air bubble formation) therein and was left standing, thus sandwiching the UV curing resin 13L between the mold glass 16 and the wiring substrate 25 to provide a pressure-receiving member 27 (FIG. 6C).

In the pressure-receiving member 27, the UV curing resin 13L was filled in a spacing between the metal electrodes 22 and had a thickness identical to a thickness h of the metal electrodes 22.

(Resin-curing Step)

Figure 6D:
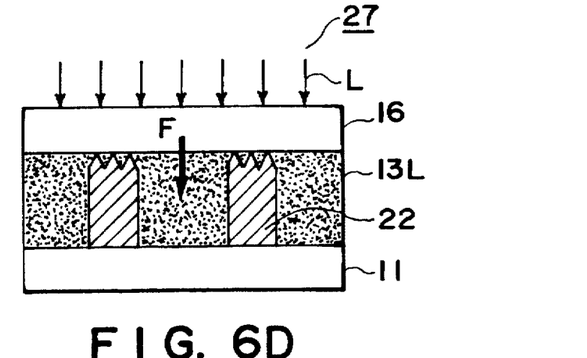

The pressure-receiving member 27 was then pressed by a pressing machine (not shown) with a force F, whereby a certain pressure was exerted on the surfaces of the metal electrodes 22 and the supplied UV curing resin 13L via the smooth mold glass 16. As a result of such a pressure application via the mold glass 16, an excessive portion of the UV curing resin 13L was removed from at least projection portions (contact portions) of the surfaces of the metal electrodes 22. After the above pressure application was performed, the UV curing resin 13L was irradiated with a UV light L to effect curing thereof while causing shrinkage thereof under no pressure application (FIG. 6D). In this step, the above pressure application may be effected at the time of UV light irradiation and the curing thereof.

(Peeling Step)

Figure 6E:
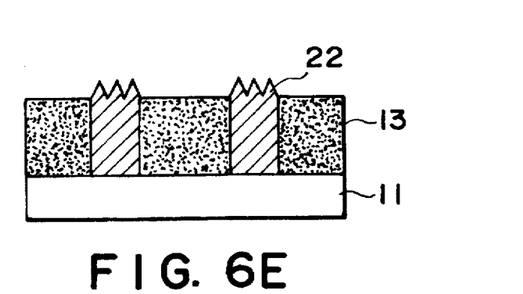

After the curing step of the UV curing resin 13 is completed, the mold glass 16 was removed by peeling (FIG. 6E).

(Second Electrode-forming Step)

Figure 6F:
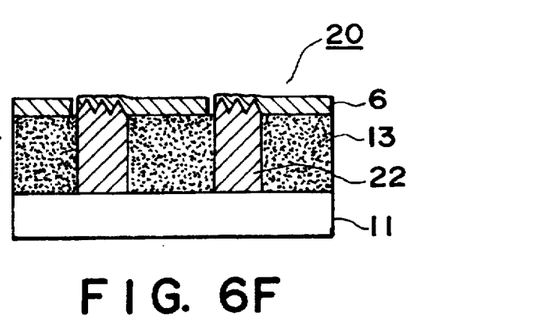

A multiplicity (plurality) of transparent electrodes (second electrodes) 6 were formed on the surface of the metal electrodes 22 so that respective transparent electrodes 6 were caused to come in contact with associated metal electrodes 22, respectively (FIG. 6F).

(Other Steps)

On the transparent electrodes 6, an insulating film 7 (not shown) and an alignment control film 9 (not shown) were successively formed to provide an electrode substrate 20 (FIG. 6E).

A pair of such electrode substrates 20 were applied to each other with a sealing agent 2 to form a blank cell having a certain cell gap, which was then filled with a liquid crystal 3 to prepare a liquid crystal panel P3.

According to this embodiment, in the resin-curing step, the UV curing resin 13 to be cured and shrunken was not partially peeled from the mold glass 16 and was uniformly sunk by curing to suppress an occurrence of a ripple-shaped sinkage, so that the resultant (cured) UV curing resin 13S providing an effective optical modulation region was allowed to have a substantially smooth (flat) surface and the upper layers formed thereon (e.g., the transparent electrodes 6 and the alignment control layer 9) also had a substantially smooth surface, respectively.

Consequently, the resultant liquid crystal panel P3 provides advantageous effects including a uniform alignment state of the liquid crystal 3; freedom from an uneven optical state, an occurrence of crosstalk and an irregularity in drive characteristics; and good image qualities, in the effective optical modulation region. Incidentally, as shown in FIGS. 5B and 6F, the metal electrodes 22 have a certain unevenness due to its surface roughness (d=20 nm) but the unevenness does not adversely affect resultant image qualities since the metal electrode portion is not subjected to display (or image formation), i.e., the metal electrodes 22 do not transmit light.

In this embodiment, the metal electrodes 22 have the surface roughness d of 20 nm, so that at least a projection portion of the metal electrode surface is not covered with the UV curing resin 13L even when the resin 13L is not completely removed from the surface portion of the metal electrodes 22 by pressure application with the mold glass 16. As a result, a contact state of the metal electrodes 22 with the associated transparent electrodes 6 is uniformly ensured over the entire surface of the electrode substrate 20 by the projection portion, thus allowing a lowering in resistance of the transparent electrodes 6 and the associated metal electrodes 22. Specifically, when a resistance per length of 60 mm of the transparent electrodes 6 and the associated metal electrodes was measured, a uniform and low resistance of 50 ohm was attained over the entire region of the electrode substrate 20.

By using such a low-resistance electrode substrate 20 in the liquid crystal panel P3, it is possible to solve a problem of the voltage waveform propagation delay during the drive of the liquid crystal panel P3 and to obviate problems of the uneven optical state and crosstalk, thus resulting in the liquid crystal panel P3 of a large picture area and a high resolution.

Further, in this embodiment, it is not necessary to provide the transparent electrodes 6 with a large thickness in order to remedy the problem of the voltage waveform propagation delay, so that the resultant liquid crystal panel P3 is improved in display quality because the transparent electrodes 6 are not lowered in transmittance, thus being not visually recognized. In addition, a film forming time of the transparent electrodes 6 is shortened and an adhesiveness of the transparent electrodes 6 to, e.g., the metal electrodes 22 is also ensured.

According to this embodiment, the metal electrodes 22 are formed under the transparent electrodes 6 (i.e., formed on the glass substrate side, not on the liquid crystal side) in contrast with those of the conventional liquid crystal panels and provide a substantially smooth face together with the UV curing resin 13 although the unevenness resulting from the surface roughness d of the metal electrodes 22 and shrinkage of the UV curing resin 13. Consequently, even if the metal electrodes 22 are made thick, the resultant alignment control film 9 has little surface unevenness. Such thick metal electrodes 22 are further effective in suppressing an occurrence of the propagation delay of a voltage waveform, and the substantially smooth surface of the alignment control film 9 is effective in preventing occurrences of the difference in optical state and crosstalk as in the case of the conventional liquid crystal panels and also effective in allowing uniform rubbing to provide a uniform alignment state of liquid crystal molecules.

SECOND EMBODIMENT

In this embodiment, a liquid crystal panel including a color filter layer comprising color filter segments of red (R), green (G) and blue (B) was prepared in the same manner as in First Embodiment except that a color filter-forming step was effected between a first electrode-forming step and a resin-supplying step.

Figure 7:
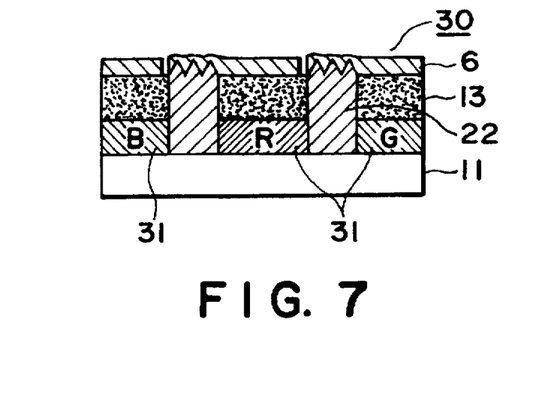
FIG. 7 is a schematic sectional view of another embodiment of a structure of an electrode substrate according to the present invention.

More specifically, FIG. 7 shows a schematic sectional view of an electrode substrate 30 used for the above liquid crystal panel.

Referring to FIG. 7, the electrode substrate 30 has a similar structure as in that of Figure Embodiment except for closely disposing a color filter layer 31 comprising color filter segments of R, G and B between a glass substrate 11 and a UV curing resin 13 and so as to fill a spacing between a plurality of metal electrodes 22. Other structural members, such as a plurality of transparent electrodes 6, an insulating film (not shown) and in alignment control film (not shown) are identical to those used in First Embodiment.

The electrode substrate 30 was produced through the steps of a first electrode-forming step, a color-filter forming step, a resin-supplying step, a resin-curing step, a peeling step, a second electrode-forming step and other steps, respectively, in a similar manner as in First Embodiment except for the color filter-forming step.

In the color filter-forming step, a solution (dispersion) of a pigment (pigment particles) in a photosensitive resin was applied onto the surface of the glass substrate (i.e., at a spacing between the metal electrodes 22) by using a roll coater, followed by selective exposure to light for development and a subsequent etching to form the color filter layer 31. Further, in the resin-supply step, a recess portion formed by the metal electrodes 22 and the color filter layer 31 was filled with a UV curing resin 13L.

According to this embodiment, similar advantageous effects a described in First Embodiment can also be attained. In addition, the liquid crystal panel prepared in this embodiment is excellent in color display qualities.

Incidentally, in the above-described embodiments (First and Second Embodiments) of the present invention, the sputtering process is used a a method for forming a metal layer having a prescribed average surface roughness. In the present invention, however, other processes including those using resistance heating and electron beam may also be adopted.

In the present invention, the sputtering process may be performed by appropriately setting a sputtering temperature of 80°–300° C., preferably 100°–250° C. (140° C. in the above two embodiments), in view of a desired surface roughness of resultant metal electrodes. Further, the metal layer for forming a plurality of metal electrodes may have a multi-layer structure consisting of at least two layers wherein a top layer is selectively subjected to etching.

In order to evaluate the effect of preventing an occurrence of a ripple-shaped sinkage of the UV curing resin (curing shrinkage ratio α=10%), various metal electrodes having different average surface roughness d and different thicknesses h shown in Table 1 shown below were formed by using associated sputtering conditions shown in Table 2 shown below, respectively.

By using the thus-prepared metal electrodes, a surface state of each of their associated UV curing resins after curing was observed to evaluate a degree of the ripple-shaped sinkage according to the following standards.

o: No ripple-shaped sinkage was observed.

x: At least one clear ripple-shaped sinkage was observed.

In this case, the observation was performed with respect to the entire effective optical modulation region by using a defect-testing apparatus (available from Admon Science Co.) wherein an enlarged image portion (50–200 magnifications) was subjected to image processing with a charge coupled device (CCD) image sensor to detect a ripple-shaped sinkage portion, as a shade portion, having a depth (height) of at least 50 nm based on a reference image portion free from a ripple-shaded sinkage. The ripple-shaped portion (shade portion) includes at least one (generally plural) elongated recess portion(s) extending in the width-wise direction of the metal electrodes.

TABLE 1

| Surface roughness | Thickness h of metal electrode | | |
|---|---|---|---|
| d (nm) | 500 (nm) | 1000 (nm) | 2000 (nm) |
| 2.5 | x | x | x |
| 5 | o | x | x |
| 10 | o | o | x |
| 20 | o | o | o |
| 30 | o | o | o |
| 40 | o | o | o |
| 50 | o | o | o |

TABLE 2

| Surface roughness | Thickness h of metal electrode | | |
|---|---|---|---|
| d (nm) | 500 (nm) (Ts/t)*1 | 1000 (nm) (Ts/t)*1 | 2000 (nm) (Ts/t)*1 |
| 2.5 | 50/170 | 50/340 | 50/680 |
| 5 | 80/170 | 80/340 | 80/680 |
| 10 | 110/170 | 110/340 | 110/680 |
| 20 | 140/170 | 140/340 | 140/680 |
| 30 | 160/170 | 160/340 | 160/680 |
| 40 | 180/170 | 180/340 | 180/680 |
| 50 | 200/170 | 200/340 | 200/680 |

*1: Ts represented a sputtering temperature (°C.) and t represented a sputtering time (sec). Other sputtering conditions were identical to those as in First Embodiment described hereinabove.

As described hereinabove, according to the process for producing the electrode substrate of the present invention, a UV curing resin having a curing shrinkage ratio α (%) is filled in a spacing between plural first (metal) electrodes having an average surface roughness d (nm) in an amount corresponding to that providing a thickness h (nm) of the first electrodes and pressed together with the first electrodes via a smooth plate member, followed by curing under no pressure application. At this time, by setting the above-mentioned three factors, α, d and h so as to satisfying the following relationship of: d≧α·h/1000, a partial peeling of the UV curing resin due to shrinkage by curing is not caused, thus suppressing an occurrence of a ripple-shaped sinkage. As a result, the surface of plural second (transparent) electrodes in an effective optical modulation region becomes substantially smooth. Accordingly, in case where such an electrode substrate is used in a liquid crystal device, an alignment state of a liquid crystal becomes uniform and good image qualities can be obtained without causing an uneven optical state and a crosstalk phenomenon.

The surface roughness d (nm) of the first electrodes is set to have a prescribed value or above (i.e., satisfying d≧α·h/1000), whereby a projection portion of the first electrode surface is projected from at least the UV curing resin surface toward the second electrodes even if the UV curing resin is not completely removed from the first electrode surface by pressure application with the smooth plate member as described above. As a result, the first electrodes and the associated second electrodes are respectively caused to come in contact with each other uniformly over the entire electrode substrate surface. In case where the electrode substrate is used in a liquid crystal device, it becomes possible to solve the problem of voltage waveform propagation delay during the drive of the device and also to obviate an occurrence of crosstalk and an irregularity in optical state, thus providing a liquid crystal device with a large picture area and a high resolution or definition.

Further, in the case of using low-resistive metal electrodes as the first electrodes of an electrode substrate, a resistance of the first electrodes and the second electrodes is lowered as a whole to remedy the problem of propagation delay of a prescribed voltage waveform applied to these (first and second) electrodes. Accordingly, when such an electrode substrate is used for producing a liquid crystal device, an uneven optical state and an occurrence of crosstalk can be suppressed to realize a liquid crystal device of a large picture area and a high definition.

In addition, by using the low-resistive metal electrodes as the first electrodes of an electrode substrate, it is unnecessary to provide high-resistive second electrode with a large thickness. Accordingly, when the electrode substrate is used as an element of a transmission-type liquid crystal display device, a problem such that the second electrodes are visually recognized due to a lowering in transmittance thereof cannot be caused, thus enhancing display qualities of the display device together with improvements in a film-forming time of the second electrodes and in an adhesiveness of the second electrodes to the corresponding first electrodes, respectively.

According to the present invention, the first electrodes and the UV curing resin together form a substantially smooth surface by forming the first electrodes on the substrate while leaving a spacing and filling the UV curing resin in the spacing, whereby a remarkable unevenness is not generated on the second electrode surface even if the thickness of the first electrode is made large in order to lower a resistance of the first and second electrodes as a whole. The thick first electrodes are effective in solving the problem of voltage waveform propagation delay. Further, in case where the resultant electrode substrate is used in a liquid crystal device, there is no concern about a difference in optical state and an occurrence of crosstalk and a liquid crystal alignment state can be made uniform.

The above-described effects can also be brought about by using plural second electrodes consisting of transparent electrodes, e.g., ITO electrodes.

According to the liquid crystal device and the production process thereof of the present invention using the above-described electrode substrate, it is possible to realize a practically advantageous liquid crystal device exhibiting excellent performances, such as a uniform alignment state of liquid crystal molecules, prevention of an occurrence of a local electric field concentration, a good optical state, freedom of crosstalk and uneven drive characteristics, and good image qualities based on the fulfillment of the above-mentioned relationship: $d \geq \alpha \cdot h/1000$.

What is claimed is:

1. An electrode substrate, comprising: a light-transmissive substrate, a plurality of first electrodes disposed with a spacing therebetween on the light-transmissive substrate, a resin filling the spacing, and a plurality of second electrodes disposed so as to be in contact with the associated first electrodes, respectively, wherein the first electrodes have a thickness h (nm) and an average surface roughness d (nm) and the resin has a curing shrinkage ratio $\alpha$ (%), said thickness h, average surface roughness d and curing shrinkage ratio $\alpha$ satisfying a following relationship:

$d \geq \alpha \cdot h/1000$, where $0 < d \leq 250$ nm.

2. A substrate according to claim 1, wherein the first electrodes are metal electrodes.

3. A substrate according to claim 1, wherein the first electrodes and the second electrodes are supplied with an identical signal.

4. A substrate according to claim 1, wherein the second electrodes are transparent electrodes.

5. A substrate according to claim 1, wherein the second electrodes comprise indium-tin oxide.

6. A substrate according to claim 1, which further comprises a color filter layer at the spacing.

7. A substrate according to claim 1, wherein the resin comprises a ultraviolet curable resin.

8. A process for producing an electrode substrate, at least comprising the steps of:

forming a plurality of first electrodes on a light-transmissive substrate while leaving a spacing between the first electrodes, filling a resin in the spacing, curing the filled resin, and forming a plurality of second electrodes on the first electrodes and the resin so as to be in contact with associated ones of the first electrodes, respectively, wherein the first electrodes have a thickness h (nm) and an average surface roughness d (nm) and the resin has a curing shrinkage ratio $\alpha$ (%), said thickness h, average surface roughness d and curing shrinkage ratio $\alpha$ satisfying a following relationship:

$d \geq \alpha \cdot h/1000$, where $0 < d \leq 250$ nm.

9. A process according to claim 8, wherein in the curing step of the resin, the resin is cured after the first electrodes and the resin is subjected to pressure application with a smooth plate member.

10. A process according to claim 8, wherein the curing step of the resin is performed by irradiating the resin with ultraviolet light.

11. A process according to claim 8, further comprises a step of forming a color filter layer at the spacing between the step of forming the first electrodes and the step of filling the resin.

12. A process according to claim 8, wherein the step of forming the first electrodes is performed through a sputtering process while controlling a temperature of the transmissive substrate so as to provide the first electrodes with said average surface roughness d.

13. A liquid crystal device, comprising: a pair of electrode substrates and a liquid crystal disposed between the electrode substrates, each of the pair of electrode substrates, comprising a light-transmissive substrate, a plurality of first electrodes disposed with a spacing therebetween on the light-transmissive substrate, a resin filling the spacing, and a plurality of second electrodes disposed so as to be in contact with associated one of the first electrodes, respectively, wherein the first electrodes have a thickness h (nm) and an average surface roughness d (nm) and the resin has a curing shrinkage ratio $\alpha$ (%), said thickness h, average surface roughness d and curing shrinkage ratio $\alpha$ satisfying a following relationship:

$d \geq \alpha \cdot h/1000$, where $0 < d \leq 250$ nm.

14. A device according to claim 13, wherein the first electrodes are metal electrodes.

15. A device according to claim 13, wherein the second electrodes are transparent electrodes.

16. A device according to claim 13, wherein the second electrodes comprise indium-tin oxide.

17. A device according to claim 13, wherein each of the electrode plates further comprises a color filter layer at the spacing.

18. A device according to claim 13, wherein the resin comprises a ultraviolet curable resin.

19. A device according to claim 13, wherein the liquid crystal comprises a chiral smectic liquid crystal.

20. A device according to claim 13, wherein the liquid crystal comprises a ferroelectric liquid crystal.

21. A process for producing a liquid crystal device, at least comprising the steps of:

forming a plurality of first electrodes on a light-transmissive substrate while leaving a spacing between the first electrodes, filling a resin in the spacing, curing the filled resin, and forming a plurality of second electrodes on the first electrodes and the resin so as to be in contact with associated ones of the first electrodes, respectively, to prepare a pair of electrode substrates, and filling a liquid crystal between the pair of electrode substrates, wherein the first electrodes have a thickness h (nm) and an average surface roughness d (nm) and the resin has a curing shrinkage ratio $\alpha$ (%), said thickness h, average surface roughness d and curing shrinkage ratio $\alpha$ satisfying a following relationship:

$d \geq \alpha \cdot h/1000$, where $0 < d \leq 250$ nm.

22. A process according to claim 21, wherein the step of forming the first electrodes is performed through a sputtering process while controlling a temperature of the transmissive substrate so as to provide the first electrodes with said average surface roughness d.

* * * * *

UNITED STATES PATENT AND TRADEMARK OFFICE
CERTIFICATE OF CORRECTION

Page 1 of 3

PATENT NO. : 5,717,475
DATED : February 10, 1998
INVENTOR(S) : Masaru Kamio, et. al.

It is certified that error appears in the above-indentified patent and that said Letters Patent is hereby corrected as shown below:

Title page,
AT [30] FOREIGN PATENT APPLICATION PRIORITY DATA

"8-041613" should read --8-14613.

Title page,
AT [57] ABSTRACT

Line 12, "a" should read --$\alpha$--.

COLUMN 1

Line 47, "unwounded)" should read --unwound)--; and
Line 56, "has" should read --have--.

COLUMN 2

Line 38, "at" should be deleted.

COLUMN 3

Line 2, "a" should read --an--.

COLUMN 4

Line 33, "somewhat an" should read --a somewhat--.

COLUMN 5

Line 67, "a" should read --$\alpha$--.

COLUMN 6

Line 32, "is" should read --are--; and
Line 36, "comprises" should read --comprise--.

UNITED STATES PATENT AND TRADEMARK OFFICE
CERTIFICATE OF CORRECTION

PATENT NO. : 5,717,475
DATED : February 10, 1998
INVENTOR(S) : Masaru Kamio, et. al.

It is certified that error appears in the above-indentified patent and that said Letters Patent is hereby corrected as shown below:

COLUMN 7

Line 35, "a" should read --an--;
Line 38, "one" should be deleted;
Line 50, "embodiments," should read --embodiment,--; and
Line 60, "was" should read --were--.

COLUMN 9

Line 34, "shrunken" should read --shrunk--.

COLUMN 11

Line 8, "a" should read --as--.

COLUMN 13

Line 60, "a" should read --an--.

COLUMN 14

Line 7, "ratio a" should read --ratio $\alpha$--;
Line 36, "one" should read --ones--; and
Line 55, "a" should read --an--.

UNITED STATES PATENT AND TRADEMARK OFFICE
CERTIFICATE OF CORRECTION

PATENT NO.  : 5,717,475
DATED       : February 10, 1998
INVENTOR(S) : Masaru Kamio, et. al.

It is certified that error appears in the above-indentified patent and that said Letters Patent is hereby corrected as shown below:

Column 16

Line 1, "a" should read --$\alpha$--.

Signed and Sealed this

Twenty-fifth Day of August, 1998

Attest:

BRUCE LEHMAN

*Attesting Officer*  *Commissioner of Patents and Trademarks*